(12) United States Patent
Brendel

(10) Patent No.: US 8,219,576 B2
(45) Date of Patent: Jul. 10, 2012

(54) STORING LOSSY HASHES OF FILE NAMES AND PARENT HANDLES RATHER THAN FULL NAMES USING A COMPACT TABLE FOR NETWORK-ATTACHED-STORAGE (NAS)

(75) Inventor: Juergen Brendel, Auckland (NZ)

(73) Assignee: Sanwork Data Mgmt L.L.C., Wilmington, DE (US)

( * ) Notice: Subject to any disclaimer, the term of this patent is extended or adjusted under 35 U.S.C. 154(b) by 0 days.

(21) Appl. No.: 12/833,527

(22) Filed: Jul. 9, 2010

(65) Prior Publication Data

US 2010/0281133 A1  Nov. 4, 2010

Related U.S. Application Data

(60) Continuation of application No. 11/838,628, filed on Aug. 14, 2007, which is a division of application No. 10/708,457, filed on Mar. 4, 2004, now Pat. No. 7,272,654.

(51) Int. Cl.
  *G06F 17/30* (2006.01)
(52) U.S. Cl. ......................................... 707/760; 709/215
(58) Field of Classification Search .......... 707/755–764, 707/780–788; 709/215–219, 201–203, 220, 709/251
  See application file for complete search history.

(56) References Cited

U.S. PATENT DOCUMENTS

| | | | |
|---|---|---|---|
| 5,121,495 A | 6/1992 | Nemes | |
| 5,287,499 A | 2/1994 | Nemes | |
| 5,511,190 A | 4/1996 | Sharma et al. | |
| 5,542,087 A | 7/1996 | Neimat et al. | |
| 5,960,434 A | 9/1999 | Schimmel | |
| 6,289,375 B1 | 9/2001 | Knight et al. | |
| 6,308,320 B1 | 10/2001 | Burch | |
| 6,314,460 B1 | 11/2001 | Knight et al. | |
| 6,330,709 B1 | 12/2001 | Johnson et al. | |
| 6,393,544 B1 | 5/2002 | Bryg et al. | |
| 6,484,250 B1 | 11/2002 | Mei et al. | |
| 6,606,690 B2 | 8/2003 | Padovano | |
| 6,658,526 B2 | 12/2003 | Nguyen et al. | |
| 6,937,612 B1 * | 8/2005 | Mauger et al. | 370/465 |

(Continued)

OTHER PUBLICATIONS

Office Action mailed Jun. 30, 2006, for U.S. Appl. No. 10/708,457.
Reasons for Allowance mailed May 17, 2007, for U.S. Appl. No. 10/708,457.
Notice of Allowance mailed Dec. 14, 2009, for U.S. Appl. No. 11/838,628.

*Primary Examiner* — Wilson Lee
(74) *Attorney, Agent, or Firm* — Schwabe, Williamson & Wyatt, P.C.

(57) ABSTRACT

Multiple Network Attached Storage (NAS) appliances are pooled together by a virtual NAS translator, forming one common name space visible to clients. Clients send messages to the virtual NAS translator with a file name and a virtual handle of the parent directory that are concatenated to a full file-path name and compressed by a cryptographic hash function to generate a hashed-name key. The hashed-name key is matched to a storage key in a table. The full file-path name is not stored, reducing the table size. A unique entry number is returned to the client as the virtual file handle that is also stored in another table with one or more native file handles, allowing virtual handles to be translated to native handles that the NAS appliance servers use to retrieve files. File movement among NAS servers alters native file handles but not virtual handles, hiding NAS details from clients.

6 Claims, 8 Drawing Sheets

U.S. PATENT DOCUMENTS

| | | |
|---|---|---|
| 6,985,956 B2 | 1/2006 | Luke et al. |
| 7,428,540 B1 | 9/2008 | Coates et al. |
| 8,041,761 B1* | 10/2011 | Banga et al. ............ 709/201 |
| 2001/0037323 A1 | 11/2001 | Moulton et al. |
| 2001/0037406 A1 | 11/2001 | Philbrick et al. |
| 2002/0178341 A1 | 11/2002 | Frank |
| 2003/0028587 A1 | 2/2003 | Driscoll et al. |
| 2003/0031176 A1 | 2/2003 | Sim |
| 2003/0039362 A1 | 2/2003 | Califano et al. |
| 2003/0043805 A1* | 3/2003 | Graham et al. ............ 370/392 |
| 2003/0046260 A1 | 3/2003 | Satyanarayanan et al. |
| 2003/0046369 A1* | 3/2003 | Sim et al. ............ 709/220 |
| 2003/0050974 A1* | 3/2003 | Mani-Meitav et al. ....... 709/203 |
| 2003/0120822 A1* | 6/2003 | Langrind et al. ............ 709/251 |
| 2003/0140051 A1 | 7/2003 | Fujiwara et al. |
| 2003/0158839 A1* | 8/2003 | Faybishenko et al. ............ 707/3 |
| 2003/0187885 A1 | 10/2003 | Miyazaki et al. |
| 2003/0195942 A1* | 10/2003 | Muhlestein et al. .......... 709/215 |
| 2003/0210689 A1 | 11/2003 | Davis et al. |
| 2003/0220985 A1 | 11/2003 | Kawamoto et al. |
| 2004/0117600 A1 | 6/2004 | Bodas et al. |
| 2004/0133652 A1 | 7/2004 | Miloushev et al. |
| 2004/0221128 A1 | 11/2004 | Beecroft et al. |
| 2005/0097260 A1* | 5/2005 | McGovern et al. ............ 711/100 |
| 2005/0138081 A1 | 6/2005 | Alshab et al. |
| 2006/0031407 A1* | 2/2006 | Dispensa et al. ............. 709/219 |

* cited by examiner

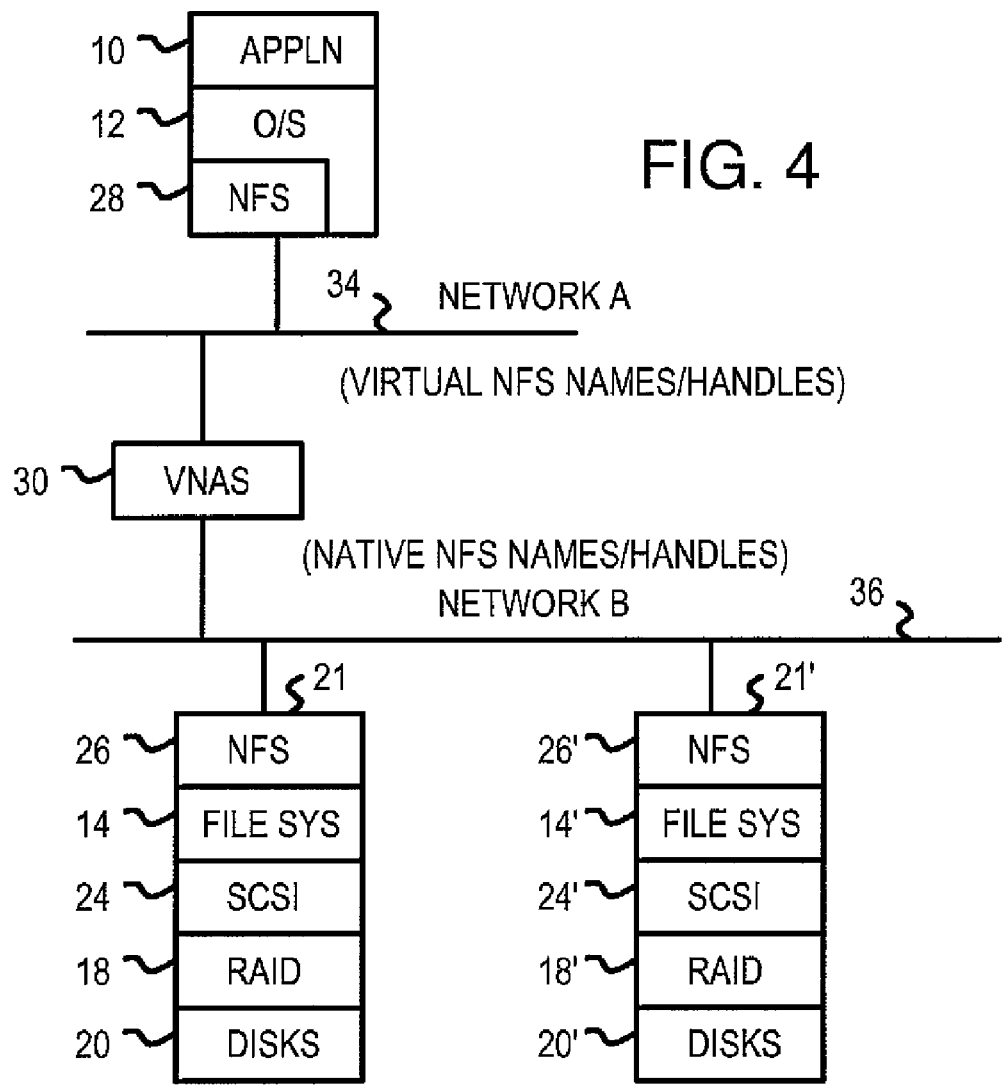
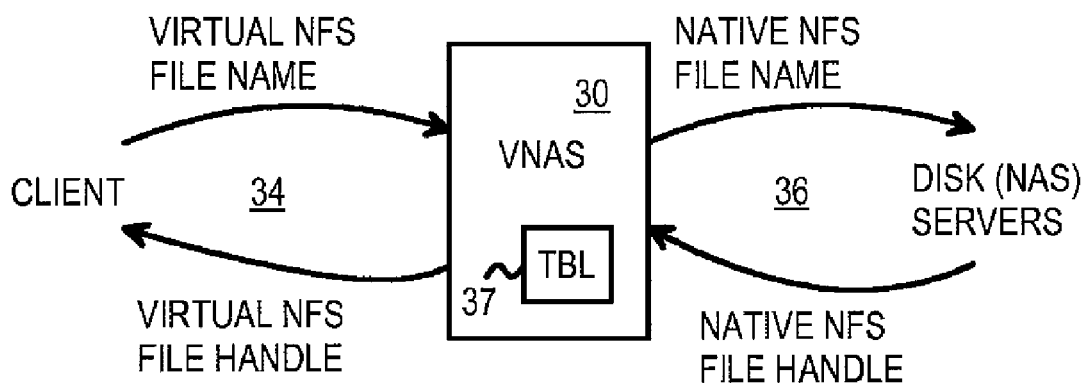

STORING LOSSY HASHES OF FILE NAMES AND PARENT HANDLES RATHER THAN FULL NAMES USING A COMPACT TABLE FOR NETWORK-ATTACHED-STORAGE (NAS)

RELATED APPLICATIONS

This application is a continuation application of "Storing Lossy Hashes of File Names and Parent Handles Rather than Full Names Using a Compact Table for Network-Attached-Storage (NAS)," U.S. application Ser. No. 11/838,628, filed Aug. 14, 2007, which is a divisional application of "Virtualizing Network-Attached-Storage (NAS) with a Compact Table that Stores Lossy Hashes of File Names and Parent Handles Rather than Full Namesa," U.S. application Ser. No. 10/708,457 filed Mar. 4, 2004, issued as U.S. Pat. No. 7,272,654 on Sep. 18, 2007. Both applications are incorporated herein by reference in their entireties.

FIELD OF THE INVENTION

This invention relates to network storage systems, and more particularly to compact-size translation tables for virtualized network-attached storage.

BACKGROUND OF THE INVENTION

Both supply and demand for computer disk storage have increased sharply in the last decade. Computer hard-disk technology and the resulting storage densities have grown even faster than in the semiconductor field, at times exceeding Moore's Law projections. Despite application-program bloat and wider use of large multimedia files, disk drive storage densities have been able to keep up.

Widespread use of networking has allowed for greater file sharing. Rather than store data files on individual users' personal computers (PCs), many companies and organizations prefer to have important files stored in a centralized data storage. Important data can be regularly maintained and archived while being available for sharing among many users when stored in central storage.

Storage Area Networks (SANs) are widely used by large corporations as such a centralized data store. FIG. 1 shows a SAN. SAN bus 22 is a high-speed bus such as a FibreChannel that connects to many disk arrays 20, 20', 20". Often Redundant Array of Independent Disks (RAID) is used to mirror data stored on the disks for greater reliability. RAID controllers 18, 18', 18" can be inserted between disk arrays 20, 20', 20" and SAN bus 22.

Clients such as application layer 10 generate disk accesses through client operating system 12, which in turn uses file system 14 to access stored data. FibreChannel controller 16 receives requests and performs physical transfers of block data over SAN bus 22.

SAN bus 22 transfers data as blocks rather than as files. File system 14 converts requests for data files into the block addresses needed for accessing the data on disk arrays 20, 20', 20". An individual file can be stored on several blocks of data that are stored on any of disk arrays 20, 20', 20".

Since SAN bus 22 performs block transfers, there is no high-level file-system controller on disk arrays 20, 20', 20". Instead, disk arrays 20, 20', 20" act as network-connected disk drives. SAN bus 22 can operate with special protocols that are designed to maximize data transfer rates of lower-level blocks of data. Thus SAN bus 22 is a specialized bus. SANs tend to be very expensive and are usually not cost-effective for smaller organizations.

Another widespread storage technology is Network Attached Storage (NAS). NAS is less expensive than SAN and uses standard Transport-Control-Protocol Internet Protocol (TCP/IP) network buses rather than a specialized SAN bus. NAS appliances are usually single-box devices such as LINUX or Windows systems that can easily be connected to a TCP/IP network.

FIG. 2 shows use of NAS and the NAS creep problem. Network bus 32 is a standard TCP/IP network bus. Client application layer 10 requests file accesses through operating system 12, which uses network-file-system (NFS) 28 to generate file request messages that are encapsulated by TCP/IP and any lower-level network protocols and sent over network bus 32 to NAS appliance 21.

NAS appliance 21 processes the message received over network bus 32 using server NFS 26, which sends the request to file system 14. File system 14 looks up the file name and finds the file handle, which is returned to application layer 10. Future requests for the data can be made by using this file handle.

File system 14 can access requested data through small-computer system interface (SCSI) controller 24 or another kind of controller to access disk arrays 20. RAID controllers 18 may be used for redundant data storage, or may be omitted.

NAS appliance 21 is easy to install and maintain, since it is connected to network bus 32 much like any other networked PC. Network bus 32 carries NFS messages encapsulated by standard TCP/IP packets, which can be the already-existing network in an organization that the client PCs are already attached to. File names and file handles are transferred over network bus 32 in the NFS messages rather than block addresses.

One problem with NAS appliance 21 is upgrading to larger storage or faster processing capacities. As its workload increases, the processor on NAS appliance 21 may no longer be able to handle all requests. Additional disks may initially be added to NAS appliance 21, but once all disk bays are populated, no more disks can be added. Instead, a second NAS appliance 21' may need to be installed on network bus 32. New data could be stored on NAS appliance 21'. However, it is difficult to move data among NAS appliance 21 and NAS appliance 21'. This is because clients have to mount to NAS appliance 21' as well as to NAS appliance 21'. Additional mount requests to NAS appliance 21' have to be added to startup scripts for all clients. Data moved to NAS appliance 21' is found on a different mount point, so clients have to use the new location to find the data. NAS appliance 21 and NAS appliance 21' appear as two different file systems, with different mount names. Each NAS appliance 21, 21' has its own name space.

It is very undesirable to have to change client software to reflect the new path to NAS appliance 21' when a file is moved from NAS appliance 21 to NAS appliance 21'. Users may have to know that the file is now accessible under a different mount-point. Applications, scripts, and shortcuts must be edited to refer to the new mount-point. It can be an administrative nightmare to notify users and change existing software and scripts when a file is moved from one name space to another. Thus moving the file is not transparent to the client users.

This is known as the NAS creep problem. It occurs when the NAS appliance 21 fills up and files have to be moved to a different NAS appliance 21', or when an additional server is installed for performance or other reasons.

FIG. 3 shows SAN combined with NAS. Client application layer 10 still sends NFS messages over network bus 32 to the NAS server, which has NFS 26 decode the messages and use file system 14 to look up file handles. Data requests for file data are converted to block addresses and sent over SAN bus 22 by FibreChannel controller 16. The data is accessed by disk arrays 20, 20', 20" and returned as block data that must be re-arranged to generate the data file.

While using a SAN with a NAS could allow for expandability, SAN bus 22 is often a FibreChannel or other very expensive bus, negating the cost advantage of NAS. Protocols such as FibreChannel or iSCSI may be used. FibreChannel Hardware tends to be expensive, while iSCSI tends to be expensive to maintain with the required drivers, etc. A SAN virtualization switch may also be needed.

Some client file systems may allow for directories to reside on different servers in one virtual space. The client file system transparently redirects client accesses to different physical servers when moving to a directory on a different server. However the granularity of re-direction is the directory rather than the file. File granularity rather than directory granularity is preferable for most file-systems.

What is desired is a Network Attached Storage (NAS) system that is expandable and upgradeable and does not use a SAN bus. File-level granularity and virtualization is desirable without altering file systems on existing NAS servers. A virtual NAS is desired that has a compact table storing meta-data on a per-file basis.

BRIEF DESCRIPTION OF THE DRAWINGS

FIG. 4 is a block diagram of a system using virtual Network Attached Storage (vNAS).
FIG. 5 highlights a virtual NAS translator.

DETAILED DESCRIPTION

Figure 1:
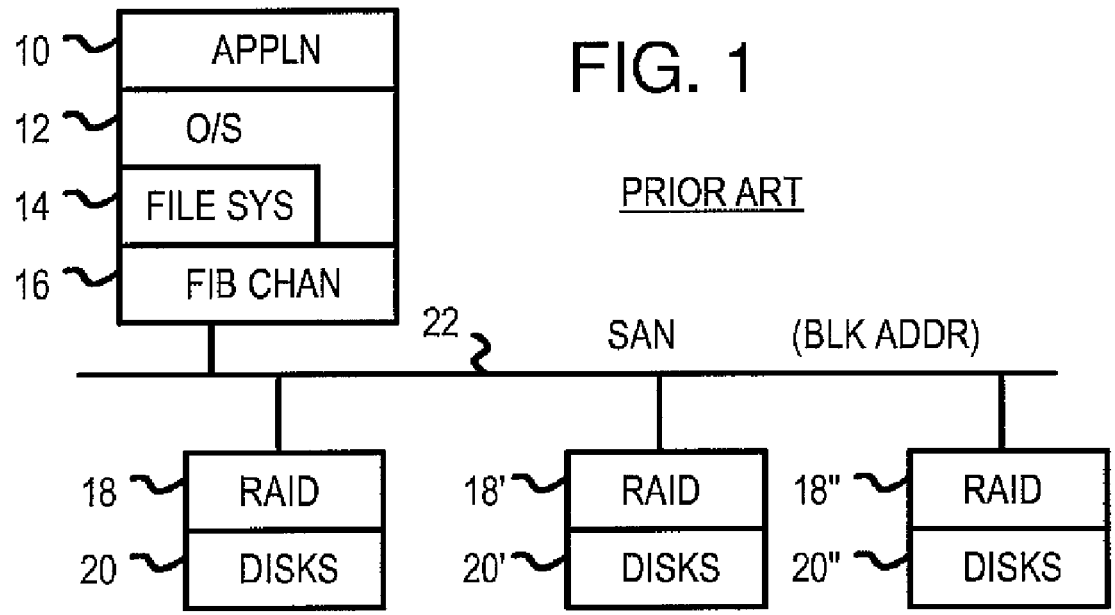
FIG. 1 shows a SAN.
Figure 2:
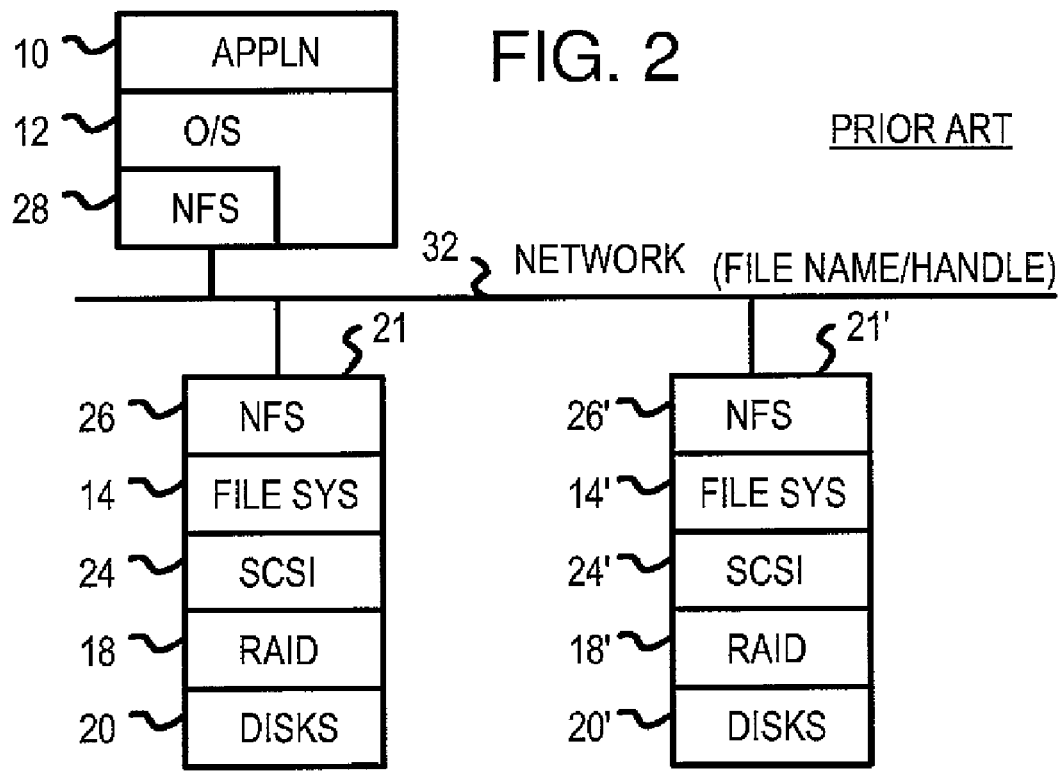
FIG. 2 shows use of NAS and the NAS creep problem.
Figure 3:
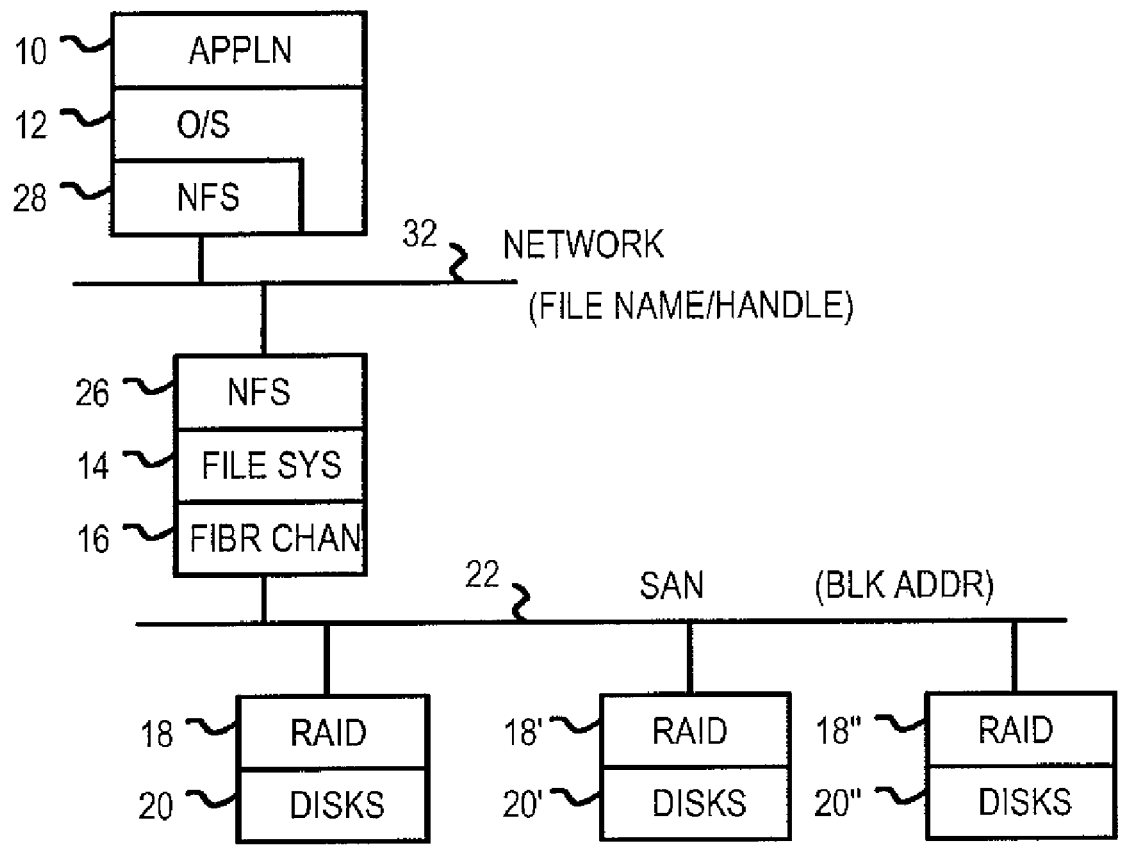
FIG. 3 shows SAN combined with NAS.

The present invention relates to an improvement in Network Attached Storage (NAS). The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

FIG. 4 is a block diagram of a system using virtual Network Attached Storage (vNAS). Client application layer 10 uses operating system 12 and NFS 28 to send NFS requests over front network 34 to virtual NAS translator 30.

Virtual NAS translator 30 receives the NFS request from clients, and performs name translation from virtual names and file handles on front network 34 to native names and file handles on back network 36. Names translated can include server names and share names.

Some client requests are translated to files that are stored on disk array 20 on NAS appliance 21, while other requests are translated to files that are stored on disk array 20' on NAS appliance 21'. NAS appliance 21 processes the translated message received over back network 36 using server NFS 26, which sends the request to file system 14. File system 14 looks up the native file name and finds the file handle. NFS 26 generates the native NFS file handle, which can reference the file handle from file system 14. The native NFS file handle is returned over back network 36 to virtual NAS translator 30. The native NFS file handle is translated to a virtual file handle by virtual NAS translator 30 and the virtual file handle returned to the client. Later requests from the client include the virtual file handle, which is translated back to the native NFS file handle by virtual NAS translator 30. Using the returned native NFS file handle, file system 14 can quickly access requested data through small-computer system interface (SCSI) controller 24 or another kind of controller to access disk arrays 20. RAID controllers 18 may be used for redundant data storage, or may be omitted.

Translated NFS requests from virtual NAS translator 30 are sent over back network 36 to one or more NAS appliances or servers. Some client requests may be sent to NAS appliance 21 while other client requests are sent to NAS appliance 21'. The client is unaware which of physical NAS appliance 21, 21' responds to each request, since names and handles are intercepted and translated by virtual NAS translator 30. Thus the specific details of where physical files are stored among NAS appliances 21, 21' are hidden from the clients. The clients see one name-space for all files accessed through vNAS.

If the data is moved from NAS appliance 21 to NAS appliance 21', virtual NAS translator 30 simply translates the same virtual file handle to a different native file handle that points to NAS appliance 21' rather than to NAS appliance 21. Virtual NAS translator 30 can move files and directories from one NAS appliance 21 to another NAS appliance 21' by changing native entries in its translation table, and by sending NFS commands to the NFS servers to physically move the file data. The virtual names and handles do not change, only the native server names and handles.

NAS appliance 21 and NAS appliance 21' appear as one single (virtual) file system, with a single server name. Both NAS appliance 21, 21' appear as one common name space, even though they have different native name spaces.

Rather than translate file names and directory names, only the share names are translated. The virtual file names and directory structures are replicated on NAS appliance 21 and NAS appliance 21' as exported paths and files. Thus the file names and directory names below the mount-point do not have to be stored in translation tables in virtual NAS translator 30, since the virtual file and lower-level directory names are already stored in the file systems of NAS appliance 21 or NAS appliance 21'.

NAS appliances 21, 21' are easy to install and maintain, since each is connected to back network 36 much like any other networked PC. Both front network 34 and back network 36 carry NFS messages encapsulated by standard TCP/IP packets and can be the already-existing network in an organization that the client PCs are already attached to. File names and file handles are translated by virtual NAS translator 30 and directed to the appropriate destination server or client.

Front network 34 and back network 36 could be the same network, such as a local intranet that carries all traffic of front network 34 and back network 36.

When storage space on NAS appliance 21 fills up, an additional NAS appliance 21' can be added by connecting it to back network 36 and informing virtual NAS translator 30 of the additional NAS resource. Other NAS appliances can be added to back network 36 once NAS appliances 21, 21' fill up their disk arrays 20, 20'. Thus additional NAS storage can be added, solving the NAS creep problem. Files can be moved among the available NAS appliances to even storage and processing loads. New files can be created on the new NAS servers by including the new server address of the new NAS server in the translation table entries for the new files, while entries for older files still point to the old NAS servers.

FIG. 5 highlights a virtual NAS translator. Virtual NAS translator 30 contains translation tables 37 that perform virtual-to-native translation of names and handles. When a client mounts to an exported directory on a NAS server through virtual NAS translator 30, the client gets a virtual file handle for the root directory of the export share. When using NFS, the client may initially open a file within that export share by performing lookups of handles for intervening directories and then sending a virtual file name and the export root virtual file handle and names of the parent directory in an NFS request message sent over front network 34 to virtual NAS translator 30. The virtual NFS file name combined with its parent handle is looked up in translation tables 37 to find a virtual NFS file handle which is returned to the client over front network 34.

The client can use this virtual NFS file handle in future requests to access data in the file. For example, the client then puts the virtual NFS file handle in a read-request NFS message sent to virtual NAS translator 30. The virtual NFS file handle is looked up in translation tables 37 to find a native NFS file handle. The native NFS file handle is sent in a NFS message over back network 36 to the NAS appliance or disk server, which locates and returns the data to virtual NAS translator 30 using the native NFS file handle.

When creating a new entry in translation tables 37 or when performing maintenance, virtual NAS translator 30 may send a native NFS file name over back network 36 to a NAS appliance, which uses its native file system to find the native file handle, which is returned as a native NFS file handle over back network 36 to virtual NAS translator 30. The native NFS file handle and native name can then be stored with the virtual NFS file handle in translation tables 37.

Thus virtual NFS file names and virtual NFS file handles are exchanged between the client and virtual NAS translator 30 over front network 34, while native NFS file names and native NFS file handles are exchanged between the NAS appliance servers and virtual NAS translator 30 over back network 36.

Native File Handles Hidden from Client

In a typical NFS system, the native NFS file handles can differ from the native file-system handles, but often the NFS layer uses the native file-system handle to create the native NFS file handle, such as by embedding the native file-system handle within the native NFS file handle. The native file-system handle often contains physical information used by the disk system to locate the data, such as a disk-block number or address.

Virtual NAS translator 30 does not interpret the native NFS file handle, but merely stores it in translation tables 37 for later use. Likewise, the virtual NFS file handle generated by virtual NAS translator 30 is not interpreted by the client, but is merely stored and later re-sent with future NFS request messages. Since the client does not interpret the virtual NFS file handle, virtual NAS translator 30 can arbitrarily generate it, such as by using a counter.

The virtual NFS file handle can have no relationship to the physical NFS file handle to allow for complete transparency to the client. This allows for a file to be moved among NAS appliances, which causes its physical NFS file handle to change, while keeping the same virtual NFS file handle.

When the native file handles are hidden from the client, virtual NAS translator 30 can perform a variety of file operations and maintenance on files stored on the NAS appliance servers without being visible to the client. For example, files can be load-balanced and moved from one NAS appliance to another NAS appliance. The virtual file and directory names are not changed but are replicated on the new NAS servers. The native file handles and server names are changed by the file movement to another server. Virtual NAS translator 30 simply replaces the old native NFS file handles or server names with the new native NFS file handles or server names without changing the virtual NFS file handles in translation tables 37. More complex data mirroring and redundancy can also be performed on the native files without changing the virtual file names and handles.

Figures 6, 7:
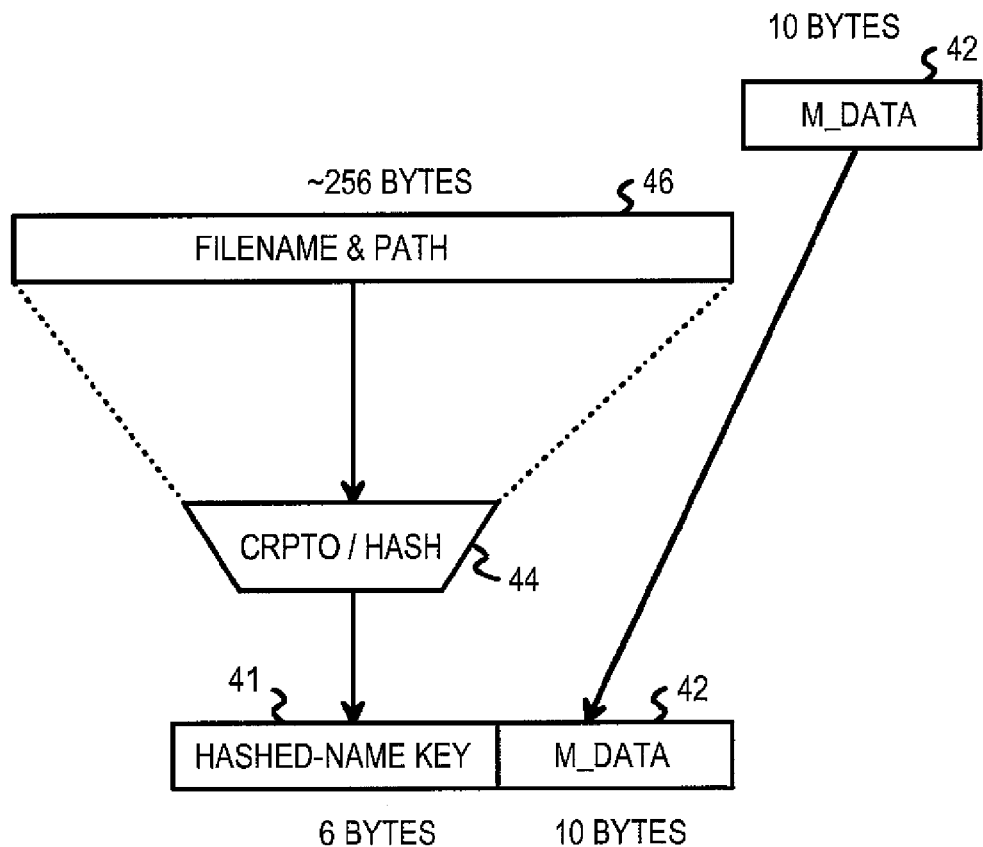
FIG. 6 shows a long path and file name.
FIG. 7 highlights hashing of a long file and path name to generate a name key for storing in a translation table.

Long File-Name Problem—FIG. 6

FIG. 6 shows a long path and file name. A file is identified by its name and the folder or directory that the file is stored in. The parent directory can be identified by its path name, which may contain names of many directories between the root and the parent directory.

For example, the spreadsheet file DES_BUDGET_REV5.XLS is in the DESIGN directory. The grand-parent directory that the DESIGN parent directory is in is the ENG directory. The ENG directory is in the DEPTS directory, which is in the BUDGET directory, etc. There are 7 directories in the path name, including the parent directory.

File and directory names are variable-length strings. The file name itself may be up to 256 bytes, depending on the server. The parent directory name may be up to 256 bytes long. Each of the 7 directory names in the path may be a character string up to 256 bytes long. The total length of name 46 may be up to 8 times 256 bytes, or 2K bytes. Other paths may be longer or shorter, but there is a potential for very long names when the directory path is concatenated with the file name.

A file system may contain hundreds of millions of files. Storing an entry with the path and file name for each file in a large file system in translation tables 37 (FIG. 5) could require an enormous amount of memory. For example, a 4 Giga-Byte memory could store 100 million entries for 100 million files, but with only 42 bytes per entry. Since each path component-name can be 256 bytes long, and the complete path may have many path components, this 4 GB memory is insufficient to store many long file names or long path names.

Solution to Long File Name Problem—Hashed-Name Entries

The inventor has realized that storing long file names and paths in translation tables is not practical even for modest-sized tables. Rather than store the file name and path, a hash of the file name and path is stored in the translation tables. Hashing compresses the variable-length file and path name to produce a smaller, fixed-sized value that is stored in the table.

FIG. 7 highlights hashing of a long file and path name to generate a name key for storing in a translation table. The file name is concatenated with its path name to generate full file-path name 46. File-path name 46 is variable length and can be well in excess of 256 bytes as each directory name in the path can be 256 bytes.

Hash engine 44 compresses file-path name 46 to generate name key 41. Regardless of the size of file-path name 46, name key 41 can be a fixed-size value such as 6 bytes. Meta-data 42 can be appended to name key 41 to generate an entry in the translation tables. For example, when 10 bytes of meta-data are stored for each entry, only 16 bytes is needed per entry, despite the presence of very long file names and paths. This allows millions of entries to be kept in reasonably-sized translation tables.

Hash engine 44 may use a cryptographic hash function that produces a seemingly random result compared with its input. Even a small change to the input value produces a large change in the hash output value when a cryptographic hash function is used. For example, a small change in the input value can produce changes in about half of the output bits in some cryptographic hash functions. This is ideal when using file-path name 46, since file systems often have many files in a very similar directory with the same path name. Files such as file4.xls and file5.xls can have largely different storage keys 40 even though their file-path names 46 differ by only one character. Having largely differing storage keys minimizes collisions in the translation tables.

Figure 8:
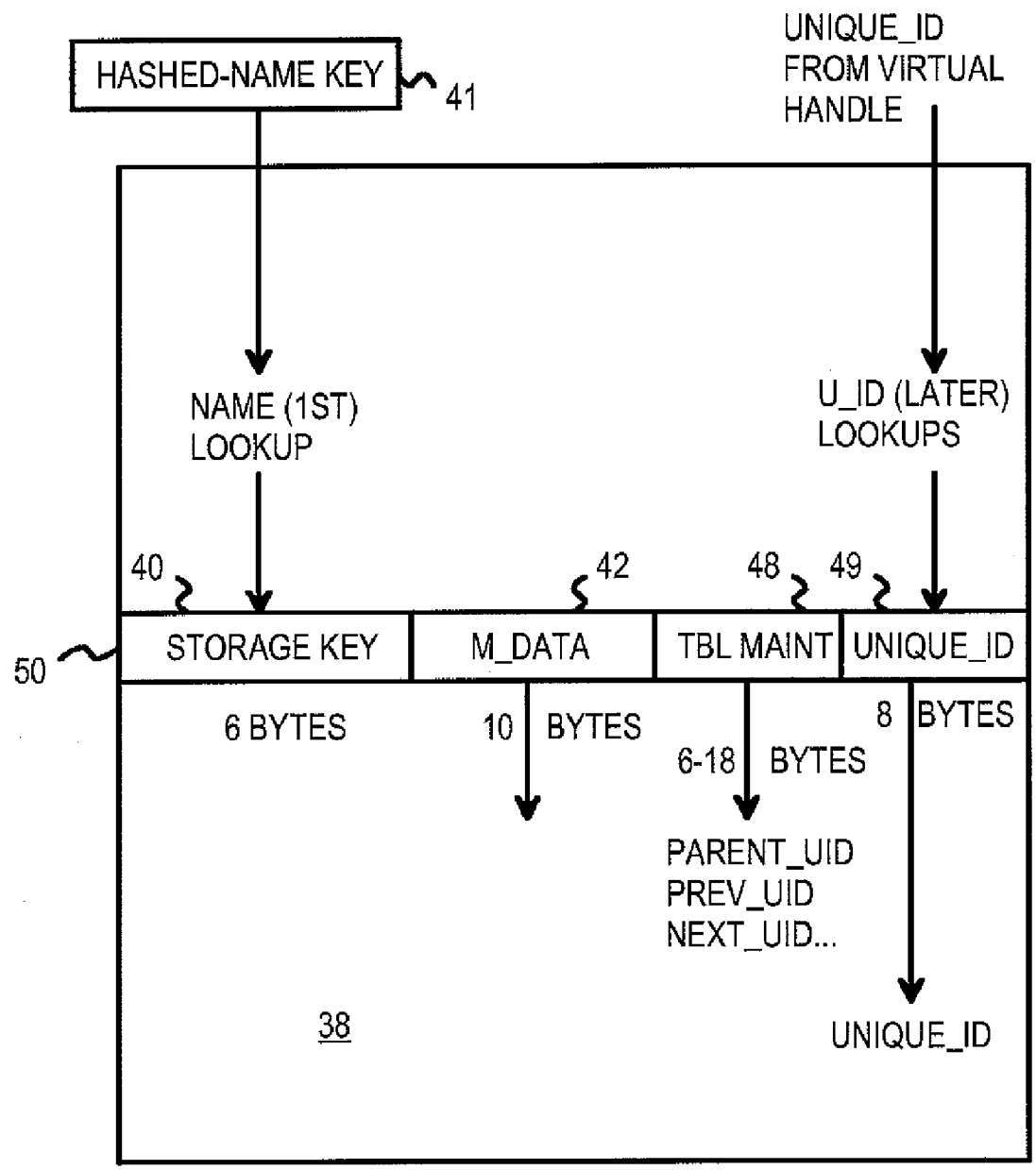
FIG. 8 shows a translation table indexed by a hashed storage key.

FIG. 8 shows a translation table indexed by a hashed storage key. Hashed-key translation table 38 contains entries for files that are physically stored on NAS appliances but are referenced by virtual names. There may be hundreds of millions of such entries.

Each entry 50 is also identified by a unique identifier. Unique ID 49 is a value generated by the virtual NAS translator that is unique for each entry. Unique ID 49 can be generated by an 8-byte up or down counter. If the counter ever rolls over, an error is signaled, but this is unlikely since there would need to be about $2^{64}$ entries. Unique ID 49 is returned to the client as part of the virtual NFS file handle. The virtual NFS file handle can contain other elements in addition to unique ID 49.

Entries in table 38 can be quickly located using unique ID 49, which is useful when the virtual NFS file handle is presented or known, such as for later lookups after an initial lookup, since the unique identifier is embedded in the virtual file handle that was returned. For the initial lookup by a client, when no virtual NFS file handle is available, entry 50 is found by matching hashed-name key 41 to storage key 40. Thus entries in table 38 can be found using either the unique ID or the hashed-name key.

Each storage key 40 is a 6-byte hash of the potentially long full file-path name, or the parent's unique ID extracted from the parent directory virtual file handle and the file name. When a client sends an initial NFS message to open a file, the file name and its path name or parent-directory unique ID are concatenated and hashed to generate hashed-name key 41. Hashed-key translation table 38 is searched using hashed-name key 41 to find matching entry 50 with storage key 40 that matches hashed-name key 41.

Once the matching entry is found, meta-data 42 may be read from entry 50 that has storage key 40 matching hashed-name key 41. The meta-data may contain information useful to the file system such as the server-name of the NAS server that stores the file, read-write privileges, time-dates of creation, modification, and last access, etc. Flags may be included, such as for indicating when the entry really refers to a directory rather than a file. Since the server's name can be stored rather than the full native NFS file handle, the size of the meta data can be reduced.

More than one server may store the file data. A server byte may be included in meta-data 42. The server byte could be an index into a server-list table with a list of servers that store the entry's file. The server list table could store Internet Protocol (IP) or other network addresses of the NAS servers that store the file. Flags and lists of shares exported by each server could also be included. Thus meta-data 42 may indicate which servers store the data in a compact way, using one or more indices rather than longer network addresses.

Table-maintenance field 48 contains overhead information useful to the virtual NAS translator, such as unique identifiers for the next and previous table elements that are useful for creating linked lists for hash tables, trees, or other types of data structures. Table-maintenance field 48 may be 6 to 18 bytes in length, and may be eliminated in some embodiments.

For some embodiments the total entry size may be 28 to 40 bytes. Hashed-key translation table 38 could have 100 million entries 50 with a 4 GB memory. Thus a large file system can be translated and virtualized by the virtual NAS translator by using hashed-key translation table 38 with hashed file-path names.

Figure 9:
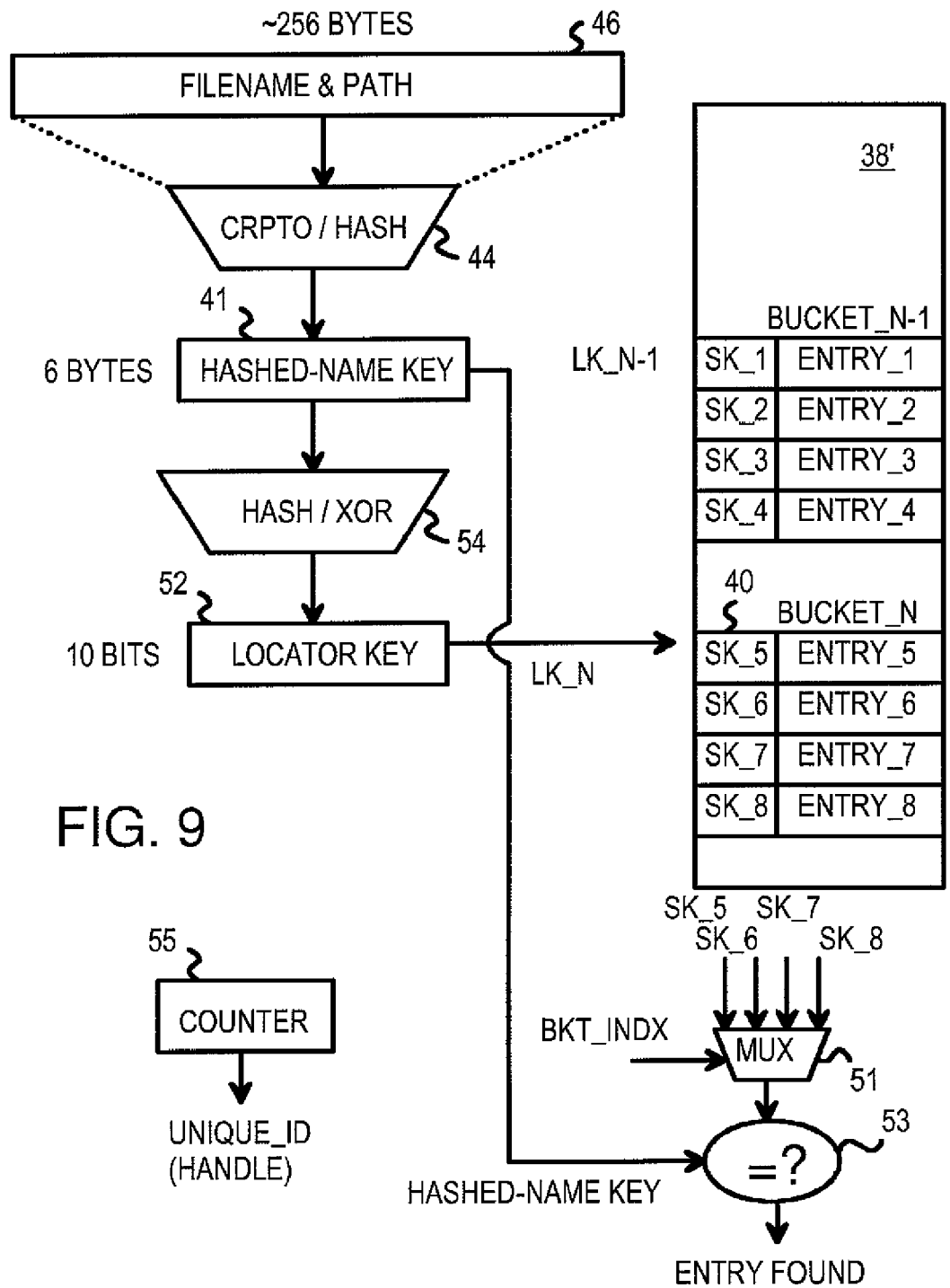
FIG. 9 is a diagram showing successive hashing to access a translation table that stores a hash of the file-path name.

Successive-Hashing—FIG. 9

FIG. 9 is a diagram showing successive hashing to access a translation table that stores a hash of the file-path name. While hashed-name key 41 could be compared to each storage key 40 in hashed-key translation table 38, this may be too slow for large tables with millions of entries. Instead, a second hashing function is used to index a subset of entries in the translation table. The second hashing can be a simple exclusive-OR (XOR) of the 6-byte storage key generated by the more computationally-complex cryptographic hash function.

The unique ID extracted from the virtual handle of the parent directory is concatenated with the file name to form file-path name 46. File-path name 46 has a variable length that can be just a few bytes long, or 256 or more bytes long. Hash engine 44 performs a cryptographic hash function on file-path name 46 to generate hashed-name key 41. Although hashed-name key 41 is compressed to 6 bytes, 6 bytes allows for up to $2^{48}$ or 281 trillion entries in hashed-key translation table 38. To narrow the search further, hashed-name key 41 is again compressed by XOR hash engine 54 to generate locator key 52.

Since locator key 52 may be 10 bits in length, the number of subsets or buckets of entries is reduced to $2^{10}$, or 1024 buckets. Bucket BUCKET_N, one of the 1024 possible buckets in successively-hashed-key translation table 38', is selected by locator key 52, LN_K. A more realistic implementation may have 20 bits, with a million buckets.

The selected bucket N can then be searched for a matching entry that has its storage key 40 matching hashed-name key 41 generated by hash engine 44. For example, bucket N has 4 entries with storage keys SK_5, SK_6, SK_7, and SK_8. Each of these entries is successively selected by mux 51 and its storage key compared to hashed-name key 41 by comparator 53. When an entry in bucket N has a storage key that matches hashed-name key 41, the matching entry is found. Meta-data 42 and table-maintenance field 48 can be read from the matching entry. The unique ID for the entry in table 38' can be embedded in the virtual NFS file handle that is returned to the client in a NFS reply message.

Counter 55 can be used to generate the unique ID for new entries that are loaded into successively-hashed-key translation table 38'. A simple up-counter with a large capacity can be used, such as an 8-byte (64-bit) binary up-counter. New entries are created in successively-hashed-key translation table 38' when a file is created or copied to the virtual NFS file system.

Figure 10:
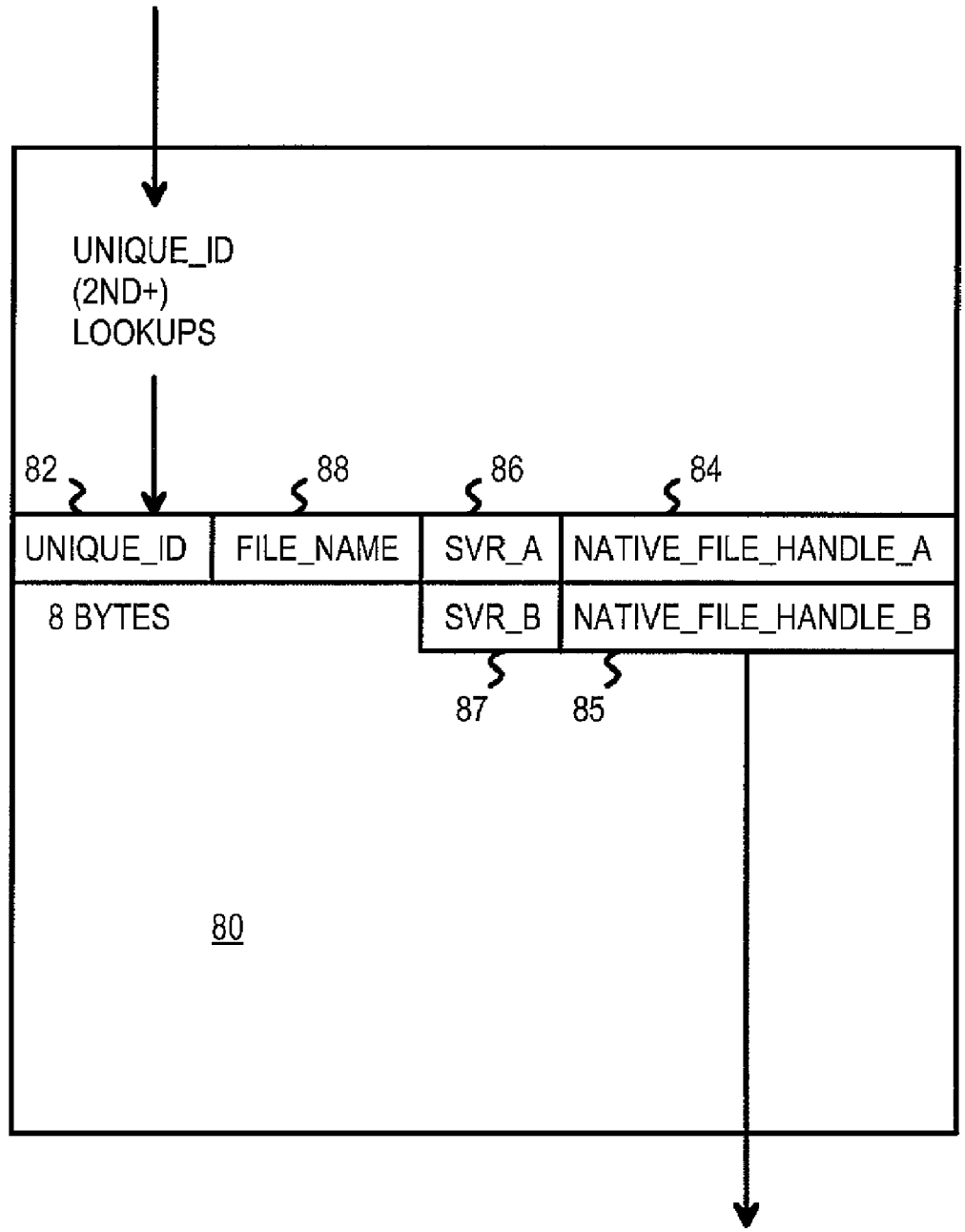
FIG. 10 shows an open-file translation table.

FIG. 10 shows an open-file translation table. Open-file translation table 80 stores entries for currently-open files, which is a subset of the files referenced by successivelyhashed-key translation table 38'. Currently open files are those that have recently been accessed or mounted.

Once a file has been opened by a client, an entry in successively-hashed-key translation table 38' already exists. Another entry is created in open-file translation table 80 for that file when it is opened. The entry is removed when the file is closed by all clients or has not been accessed for a long period of time.

Rather than be indexed by hashed-name key 41, open-file translation table 80 is indexed by the unique ID extracted from the virtual file handle. The virtual file handle contains unique ID 49 (FIG. 8) that was generated by counter 55 (FIG. 9). When a client sends a NFS request with a virtual file handle, the virtual NAS translator extracts the unique ID from the virtual file handle, and uses the extracted unique ID to locate the matching entry in open-file translation table 80.

Each entry in open-file translation table 80 contains a portion of the virtual file handle, unique ID field 82, which is the look-up key to the entry. A matching entry in open-file translation table 80 is found by comparing a unique ID from the client to unique ID field 82 to find a match. The unique ID from the client was earlier sent to the client from successively-hashed-key translation table 38'. The unique ID is contained within the virtual NFS file handle.

Once a match is found, other fields in the matching entry can be read, such as native file handle field 84, which contains the native file handle. Thus virtual file handles can quickly be translated to native file handles using open-file translation table 80.

The file name can be stored in file name field 88 in the matching entry in open-file translation table 80. The path or parent directory's virtual file handle could also be stored, but is not needed. While storing the file name is not required, having the file name allows for more rapid creation of full path names, since the file and directory names can be directly and rapidly read from open-file translation table 80.

The native NFS file handle for the file is stored in native file handle field 84. Server field 86 can contain server information, such as pointer or index to the IP address of the NAS appliance storing the file, or a pointer or index to an entry in server-list table with a list of servers that store the entry's file.

The file may be stored on several NAS servers, rather than on just one NAS appliance. This allows for load-balancing of requests and redundant storage and back-ups. Pairs of native NFS file handles and server bytes are stored. For example, native file handle field 84 stores a first native file handle FH_A while its paired server field 86 contains the IP address of server A that stores the first copy of the file. A second copy of the file is referenced by native file handle field 85 that stores a second native file handle FH_B that is paired with server field 87 containing the IP address of server B that stores the second copy of the file. Entries in open-file translation table 80 could be variable-length or could be fixed length with a pointer to a list of server-native file handle pairs in another table.

Entries in open-file translation table 80 can expire after a period of non-use. Expiration of entries in open-file translation table 80 does not cause failures, since the file's entry can still be found in successively-hashed-key translation table 38' using the unique ID from the virtual file handle from the client. A fresh entry in open-file translation table 80 can be created, such as from the unique ID of the parent and by re-generation of the storage key.

Figure 11:
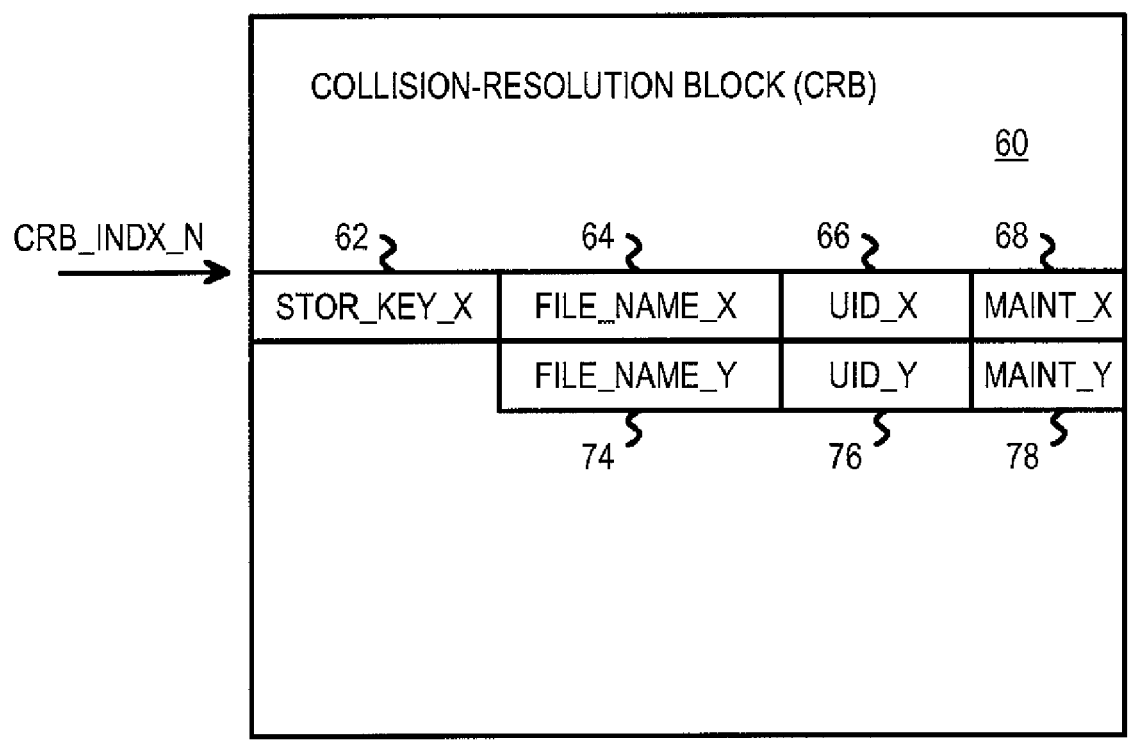
FIG. 11 shows a collision-resolution table.

FIG. 11 shows a collision-resolution table. Although rare, it is possible that two file-path names 46 (FIG. 9) could yield the same hashed-name key 41 using the cryptographic hash function of hash engine 44. Collision-resolution block 60 is used to handle such collisions caused by aliasing of the cryptographic hash function of hash engine 44. Aliasing occurs when two or more inputs to the hash function produce the same output value. Such aliasing is a problem with successively-hashed-key translation table 38' using the storage key index, not with open-file translation table 80 which is referenced by Unique ID 49 which cannot have aliases. Aliasing of successively-hashed-key translation table 38' does not occur when using the unique ID to look up entries.

Collision-resolution block 60 contains entries of differing file-path names 46 that generated the same hashed-name key 41. The aliased hashed-name key is stored as storage key 62, which is the index to the entry in collision-resolution block 60. Each entry contains file-path names for two different files, in file-path name fields 64, 74. Three-way collisions could have three file-path names and unique ID's, but a three-way collision is quite unlikely to occur.

One colliding file X has its full file-path name FILE_NAME_X stored in first file-path name field 64. The Unique ID for this file is stored in first unique ID field 66. The files meta-data can be read using this unique ID to find its entry in successively-hashed-key translation table 38'. Table-maintenance field 68, if present, contains other information useful to manage the storage data structure of collision-resolution block 60, such as linked list pointers, etc.

The second colliding file Y has its full file-path name FILE_NAME_Y stored in second file-path name field 74. The Unique ID for this file is stored in second unique ID field 76. The file's meta-data can be read using this unique ID to find its entry in successively-hashed-key translation table 38'. Table-maintenance field 78 contains other information useful to manage the storage data structure of collision-resolution block 60, such as linked list pointers, etc. Alternately, meta-data fields could also be provided for each file in collision-resolution block 60 to avoid a lookup of successively-hashed-key translation table 38'.

When a collision has occurred, the matching entry for the aliased hashed-name key 41 is altered to include a simple collision flag, or a more complex pointer CRB_INDX_N to the entry N in collision-resolution block 60 rather than the normal entry data. When searching successively-hashed-key translation table 38' with aliased hashed-name key 41, a set collision flag indicates that collision-resolution block 60 must be consulted using the pointer or aliased hashed-name key 41. The unique IDs are then read from either unique ID field 66 when the file name matches first file-path name field 64 or unique ID field 76 when the file name matches second file-path name field 74.

Collision Upon File Creation

A collision can occur when a new file is created, renamed, or moved. The newly-created file has its hashed-name key 41 generated from its file-path name 46. When a match is found for its hashed-name key 41, a collision is signaled, since the newly-created file should have no matching entry in successively-hashed-key translation table 38'.

The full file-path name of the old file in the colliding entry in successively-hashed-key translation table 38' is re-generated, perhaps by traversing the path with the parent unique ID in table-maintenance field 48 in a series of entry lookups for names of higher-level parent directories in the path. Once the full file-path name is generated, its is written to first file-path name field 64. The colliding entry's unique ID is copied to first unique ID field 66 and its table-maintenance field 48 copied to table-maintenance field 68. The data in the colliding entry is then changed to set a collision flag and/or to include a collision pointer to the new entry in collision-resolution block 60.

The newly-created file is assigned a new unique ID that is copied to second unique ID field 76 and its table-maintenance field 78 is generated and stored. The full file-path name of the newly-created file is written to second file-path name field 74. An entry for the newly-created file is created in open-file translation table 80 using the new unique ID. Meta-data for the newly-created file is written to open-file translation table 80 and/or to collision-resolution block 60. A new entry is created in successively-hashed-key translation table 38' for the newly-created file, with a different unique identifier, its meta-data, and a collision flag or pointer. The old entry in successively-hashed-key translation table 38' for the old file is unlinked so that it cannot be accessed by the storage key, only by the old file's unique identifier. This new entry for the old file is accessed by the unique ID of the old file. The new colliding entry in successively-hashed-key translation table 38' is not used for either the old file or the newly-created file except to signal the collision. The entries for the old and new files are not accessible using the storage key but only by using the unique identifiers. The new colliding entry is accessible using the colliding storage key.

Future Accesses with Virtual File Handle Do Not Collide

The client uses the virtual file handle (the unique ID) in future accesses, which pass through open-file translation table 80 rather than successively-hashed-key translation table 38'. Thus collision handling is not needed for future references of the colliding file by the same client. When the entry in open-file translation table 80 expires, the entry in successively-hashed-key translation table 38' is still available, which can be accessed by the unique ID without colliding.

When a future opening of the newly-created file occurs from another client, the hashed-name key 41 generated matches the altered entry in hashed-key translation table 38'. The collision flag is set, causing the virtual NAS translator to read the entry for the collision pointer rather than for the normal meta-data and unique ID. The collision pointer or storage key locates the proper entry in collision-resolution block 60. The virtual NAS translator then compares the file-path name for the newly-opened file to the file names in file-path name fields 64, 74 and finds that the name matches second file-path name field 74. The second unique ID is read from second unique ID field 76 and returned to the client in the virtual file handle.

Alternate Embodiments

Several other embodiments are contemplated by the inventors. Rather than use NFS, Common-Internet-File-System (CIFS) or another network file messaging system could be used. Each storage key 40 is a 6-byte hash of the potentially long full file-path name for CIFS, or the parent's unique ID extracted from the parent directory virtual file handle and the file name, for NFS requests. The numbers of bytes for various fields can vary. For example, the storage key could be 8 bytes or 5 bytes or 12 bytes or some other amount, and different numbers of bytes of meta-data may be stored. The native file handle could be 32 bytes or 64 bytes or whatever is used by the servers. Table maintenance fields could be eliminated, or be 4, 8, 16, or some other number of bytes. Other fields can likewise have various lengths rather than the lengths in the examples described herein.

The native file handles do not have to be stored in any of the tables, but may be stored in open-file translation table 80 to improve performance. When not available from the tables, the native file handle can be obtained by sending a NFS request from the virtual NFS translator to one of the NAS servers, which can find the native file handle on its file system. Additional software or hardware layers could be added, such as for load-balancing, quality-of-service, or maintenance.

Rather than have a single common name space, multiple but separate common name spaces could be supported, such as for different groups that do not wish to share files but use the same virtual NAS translator and NAS appliances.

For protocols that do not support the concept of open and closed files, such as earlier versions of NFS, a file can be closed by the virtual NAS translator when it has not been accessed for a period of time. Entries that have not been accessed for this period of time could be removed from open-file translation table 80 by table maintenance routines. This period of inactivity could be programmable.

Rather than store two separate entries for each file, one in successively-hashed-key translation table 38' and the other in open-file translation table 80, the file's entry could be stored in a third table. Meta-data 42 could be moved to this third table. A pointer to the entry in the third table then substituted for meta-data 42 in successively-hashed-key translation table 38' and open-file translation table 80.

Then successively-hashed-key translation table 38' is merely an index table to find the entry in the third table. Alternately, open-file translation table 80 could point to the full entries in successively-hashed-key translation table 38'. The unique identifier could be modified before being inserted into the virtual file handle, such as by inverting all bits, adding an offset, or performing some other function on it.

Open-file translation table 80 could be merged with successively-hashed-key translation table 38' or hashed-key translation table 38. A pointer in the merged table could point to additional information for currently-open files, such as the native file handles.

Data structures such as tables can be implemented in a wide variety of ways with many variations, such as trees, sorted tables, databases, etc. The virtual NAS translator can be implemented in software, firmware, or hardware using modules, routines, programming objects, etc.

The hashed translation table can store one entry per file. However, some servers allow the use of hard-links in their native file system. A hard-link allows for two names referring to the same INODE. Those names can be in different directories, or within the same directory. These can be viewed as two individual entries in the native file system for the same file. The two entries can appear as different file-names, and mimic different files. User Datagram Protocol (UDP) or another network protocol rather than TCP may be used for message communication.

Various hash functions could be used, such as full cryptographic hash functions or pseudo-cryptographic hash functions that are not as secure but still produce a sufficiently random-looking output to minimize collisions. Many such functions are known in the prior art. Hashing could be nested, and the handle and file name could be separately hashed or even refer to nested entries in a nested table structure. Part of the storage key could be the parent's unique identifier while the other part is the hashed file name. Various other composite keys could be substituted.

Actual file and directory names could be translated. Other forms of translation are possible using special mapped entries. Triangular data flow may be used to bypass the virtual NAS translator on the return path from the NAS server to the client. The native NFS file handle could be sent directly back to the client rather than be sent in a NFS message over back network 36 to the virtual NAS server. Some directories and files may not be virtualized, or may be handled in a different manner.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. An apparatus, comprising:
    a network interface configured to receive a file-access request from a client over a network, wherein the file-access request includes a virtual file handle having a unique identifier;
    a translator coupled to the network interface, and configured to receive from the network interface the virtual file handle, extract the unique identifier, and determine a native file handle from an entry in a translation table corresponding to the unique identifier, wherein the entry in the translation table is selected from one of a plurality of entries in the translation table and wherein each of the plurality of entries in the translation table includes a server name of a server that stores a file and information related to at least one of read-write privileges, creation, or modification of the file;
    a request forwarder coupled to the translator and the network interface, and configured to generate a translated file-access request that includes the native file handle; and
    a storage device configured to store the file of the file-access request and to receive the translated file-access request from the request forwarder.

2. The apparatus of claim 1, wherein the storage device is a network attached (NAS) appliance server selected from a plurality of NAS appliance servers.

3. The apparatus of claim 1, wherein the translation table is an open-file translation table that stores entries for currently open files.

4. The apparatus of claim 1, further comprising:
    a hash engine coupled to the network interface, and configured to receive from the network interface, a file name and path location included in an initial file-access request from the client, and to generate a hashed-name key based at least in part on the file name and the path location.

5. The apparatus of claim 4, further comprising a reply generator coupled to the network interface, and configured to generate, in response to the initial file-access request, a reply including the virtual file handle to be sent through the network interface to the client.

6. The apparatus of claim 1, wherein the apparatus is configured to move the file to a second storage device by changing entries in the translation table and by sending commands to the storage device and the second storage device to physically move the file to the second storage device.

* * * * *

UNITED STATES PATENT AND TRADEMARK OFFICE
CERTIFICATE OF CORRECTION

PATENT NO. : 8,219,576 B2  Page 1 of 1
APPLICATION NO. : 12/833527
DATED : July 10, 2012
INVENTOR(S) : Brendel It is certified that error appears in the above-identified patent and that said Letters Patent is hereby corrected as shown below:

In Column 1, Line 17, delete "Namesa,"" and insert -- Names," --, therefor.

In Column 8, Line 37, delete "2"" and insert -- $2^{48}$ --, therefor.

In Column 10, Line 20, delete "files" and insert -- file's --, therefor.

In Column 10, Line 61, delete "its is" and insert -- it is --, therefor.

In Column 14, Line 14, in Claim 2, delete "attached" and insert -- attached storage --, therefor.

Signed and Sealed this
Twenty-fifth Day of December, 2012

David J. Kappos
*Director of the United States Patent and Trademark Office*